US006937342B2

(12) United States Patent
Osinski et al.

(10) Patent No.: US 6,937,342 B2
(45) Date of Patent: Aug. 30, 2005

(54) MONOLITHICALLY INTEGRATED SEMICONDUCTOR UNIDIRECTIONAL RING LASER ROTATION SENSOR/GYROSCOPE

(75) Inventors: Marek A. Osinski, Albuquerque, NM (US); Edward W. Taylor, Albuquerque, NM (US); Petr G. Eliseev, Albuquerque, NM (US)

(73) Assignee: Science & Technology Corporation @ University of New Mexico, Albuquerque, NM (US)

(*) Notice: Subject to any disclaimer, the term of this patent is extended or adjusted under 35 U.S.C. 154(b) by 141 days.

(21) Appl. No.: 10/195,141

(22) Filed: Jul. 11, 2002

(65) Prior Publication Data

US 2003/0030814 A1 Feb. 13, 2003

Related U.S. Application Data

(60) Provisional application No. 60/304,840, filed on Jul. 11, 2001.

(51) Int. Cl.$^7$ ............................................. G01C 19/66
(52) U.S. Cl. ..................................................... 356/461
(58) Field of Search ............................... 356/459, 460, 356/461; 372/94; 385/12

(56) References Cited

U.S. PATENT DOCUMENTS

| | | | | |
|---|---|---|---|---|
| 4,035,081 A | * | 7/1977 | Sepp et al. | ................. 356/459 |
| 4,521,110 A | * | 6/1985 | Roberts et al. | ............. 356/459 |
| 4,647,204 A | * | 3/1987 | Honeycutt et al. | .......... 356/459 |
| 4,913,548 A | * | 4/1990 | Vick | .......................... 356/461 |
| 5,349,601 A | * | 9/1994 | Hohimer et al. | ............. 372/94 |
| 6,559,949 B1 | * | 5/2003 | Numai | ....................... 356/459 |

FOREIGN PATENT DOCUMENTS

| | | | | |
|---|---|---|---|---|
| JP | | 359041883 A | * | 3/1984 |
| JP | | 020000205864 A | * | 7/2000 |

* cited by examiner

*Primary Examiner*—Samuel A. Turner
(74) *Attorney, Agent, or Firm*—Schwegman, Lundberg, Woessner & Kluth, P.A.

(57) ABSTRACT

A monolithically integrated semiconductor laser rotation sensor/gyroscope that includes at least two isolated, non-synchronized semiconductor lasers; at least one being unidirectional and at least a further one being either a straight-line laser or a second unidirectional ring laser configured to propagate lasing light waves in the direction opposite to the first unidirectional ring laser; semiconductor directional waveguide couplers; a semiconductor Y-junction mixing region; and a semiconductor photodetector. Evanescently outcoupled signals are routed to a photodetector for detection of the Sagnac shifted frequencies to discern a beat frequency resulting from rotation of the chip structure. The straight-line semiconductor laser serves as frequency reference insensitive to rotation. Directing, filtering, and radiating unwanted reflections or backscattered light to highly absorbing regions is carried out with waveguide coupler designs and nonreciprocal couplers and filters.

52 Claims, 4 Drawing Sheets

MONOLITHICALLY INTEGRATED SEMICONDUCTOR UNIDIRECTIONAL RING LASER ROTATION SENSOR/GYROSCOPE

CROSS-REFERENCE TO RELATED APPLICATION

The present application is based on U.S. Provisional Patent Application No. 60/304,840 filed Jul. 11, 2001, the entire disclosure and contents of which are hereby incorporated by reference.

STATEMENT REGARDING FEDERALLY SPONSORED RESEARCH OR DEVELOPMENT

Federally sponsored research was provided by the National Aeronautics and Space Administration (NASA).

BACKGROUND OF THE INVENTION

1. Field of the Invention

The invention relates to optical rotation rate sensors and gyroscopes, and more particularly to the design and fabrication of lock-in-free, monolithically integrated semiconductor unidirectional ring laser sensors/gyroscopes.

2. Discussion of Related Art

The Sagnac effect evolves from the interaction of light with rotational movement, and provides a means of detecting the rotation, its orientation, and angular speed (see a review paper "Sagnac Effect" by E. J. Post, Rev. Mod. Phys., vol. 39, pp. 475–493, 1967). Prior attempts to use semiconductor bidirectional ring lasers for achieving rotation or gyroscopic sensing, described for example in P. J. R. Laybourn, M. Sorel, G. Giuliani, and S. Donati, "Integrated Semiconductor Laser Rotation Sensor", Integrated Optics Devices III, Jan. 25–27, 1999, San.Jose, Calif., Proc. SPIE, vol. 3620, pp. 322–331, have not resulted in detection of a Signac beat frequency due to a high lock-in rate, resulting from significant backscattering of counterpropagating light within the bidirectional structure.

To date, the Sagnac effect has not been realized in either unidirectional ring laser (URL) or bidirectional ring laser (BRL) semiconductor structures. This may be due to intrinsic limitations associated with previously applied gyro designs.

Research and development directed at fabrication of chip-size semiconductor ring lasers for application as rotation sensors has been quite limited and is still very immature. Early attempts to use semiconductor BRLs for the purpose of rotation sensing had been unsuccessful and were abandoned for many years. As a new development, monolithic integration of a ring laser, waveguides, couplers and a detector in a single semiconductor chip was reported in P. J. R. Laybourn, M. Sorel, G. Giuliani, and S. Donati, "Integrated Semiconductor Laser Rotation Sensor", Integrated Optics Devices III, Jan. 25–27, 1999, San Jose, Calif., Proc. SPIE, vol. 3620, pp. 322–331, indicating that a new generation of chip-size rotation sensors may be evolving.

During the dynamic testing of an integrated semiconductor gyro, however, no beat frequency associated with Sagnac effect could be detected, even at rotation rates approaching $\Omega = 4000$ rad s$^{-1}$. The absence of a beat frequency was attributed to a high lock-in rate resulting from significant backscattering of light within the BRL structure and from a variety of index discontinuities and transition regions within the integrated chip structure. The lock-in threshold rotational speed for an open-cavity ring laser is given by the expression $$\Omega_L = \frac{r_{21} c E_2}{E_1 L}, \qquad (1)$$

where $r_{21}$ is the coupling coefficient between two counterpropagating modes of amplitudes $E_1$ and $E_2$, c is the speed of light in vacuum, and L is the ring cavity length. Experimental verification of the magnitudes of the variables shown in Eq. (1) as they relate to a closed loop (constant L) ring laser gyro is paramount to success in gyro design.

However, direct measurement of the variables is not possible using the BRL design of P. J. R. Laybourn, M. Sorel, G. Giuliani, and S. Donati, "Integrated Semiconductor Laser Rotation Sensor", Integrated Optics Devices III, Jan. 25–27, 1999, San Jose, Calif., Proc. SPIE, vol. 3620, pp. 322–331, rendering the exact mechanism(s) responsible for the reported lock-in as indeterminate. Moreover, it has not even been established that bidirectional operation, essential for rotation sensing in a BRL gyro design, has actually been achieved. In fact, M. Sargent in "Theory of a Multimode Quasi-Equilibrium Semiconductor Laser", Phys. Rev. A, vol. 48 (1), pp. 717–726, July 1993. predicted theoretically that stable single-frequency BRL operation could not even occur in semiconductor lasers.

Most recent measurements of the output signals from BRLs by M. Sorel, P. J. R. Laybourn, G. Giuliani, and S. Donati, reported in "Unidirectional Bistability in Semiconductor Waveguide Ring Lasers", Appl. Phys. Lett., vol. 80, pp. 3051–3053, 2002, confirmed that this prediction was indeed correct, and rather than a stable bidirectional emission, a bistable unidirectional ouptut was observed It is desired to achieve the Sagnac effect in semiconductor ring lasers. It is further desired to provide a ring laser gyroscope that greatly reduces or eliminates the lock-in phenomenon associated with bidirectional ring lasers and other gyro designs.

SUMMARY OF THE INVENTION

One aspect of this invention relates to a unidirectional ring laser gyroscope and rotation sensor that may be miniature, monolithic and microchip-size. They may incorporate a monolithic integration of URLs, waveguides, couplers, filters, detectors and nonreciprocating elements onto an integrated semiconductor medium. At least one pair of these unidirectional ring lasers with carefully controlled level of outcoupled light are used to greatly reduce or eliminate the lock-in phenomenon, which is associated with bidirectional ring lasers and other gyro designs. Alternatively, at least one pair of a unidirectional ring laser and a frequency reference laser may be used for the same purpose.

The reduction in the effects of the lock-in phenomenon or other noise sources is attained in accordance with the invention despite the elimination of the conventional requirement for dithering or modulation of signal frequencies.

The rotation sensor may be capable of using a multiplicity of semiconductor URLs with opposite directions of light propagation and carefully controlled light out-coupling to achieve lock-in free rotation sensing and vastly improved gyroscopic performance. The semiconductor URLs may include individual lasers that are isolated (to the degree necessary to prevent lock-in) and decoupled to minimize or eliminate lock-in effects arising from the backscattering of light from counterpropagating modes. By analogy with the stability requirements for a solitary semiconductor laser subjected to optical feedback, as described by R. W. Tkach and A. R. Chraplyvy in "Regimes of Feedback Effects in 1.5 $\mu$m Distributed Feedback Lasers", J. Lightwave Technol., vol. LT-4, pp. 1655–1661, 1986, the coupling coefficient required to prevent lock-in between the two semiconductor lasers in the present invention should be smaller than $10^{-5}$. The coupling coefficient is defined as the ratio of reflected or backscattered light power to the internal power circulating inside the laser. A semiconductor waveguide medium and integrated component geometry may be provided that outcouples a small fraction of the signal beam from each URL and transports light from the URLs to the light signal mixing and detecting regions. Preferably, the ring laser only requires light amplification in a portion of the laser cavity and structure for achieving sensing operations.

Quantum well interdiffusion and/or intermixing (QWI) techniques may be employed to alter and customize the refractive indices and refractive index profiles of the integrated photonic and optical elements of the invention. This is done for the purpose of reducing light absorption and scattering and allowing effective monolithic integration of all components and component interfaces.

QWI techniques are adopted to provide tailored refractive index regions for achieving low light scattering between the URLs and waveguide couplers. The QWI techniques also provide tailored refractive index regions for achieving low light scattering between the waveguide, Y-junction and detector regions.

The semiconductor detector region detects the gyroscopic beat frequency while the amount of backscattered light is carefully controlled. An electronic detection technique is used for processing and quantifying changes to the electrical characteristics of the URLs in order to measure the magnitude of the Sagnac effect. A direct measurement of beat frequency from the URLs is attained by using the electronic detection circuitry and signal processing.

A monolithically integrated semiconductor gyro is provided that is based on the combination and interaction of a URL and that of a straight line laser, which act together to detect the angular velocity and direction of motion of an applied rotation, via the well-known Sagnac effect. The URLs are located in proximity for the purpose of eliminating laser frequency drift(s) and effects caused by internal and external perturbations. Spiral-shaped waveguide components are provided for the purpose of mitigating and eliminating backscattered and reflected light that could result in gyro lock-in effects.

Spatially-selective quantum-well intermixing is used to reduce absorption in the outcoupling and light-transmitting waveguides, while keeping high absorption in spiral-shaped waveguide regions, for the purpose of reducing the amount of backscattered light or inducing a unidirectional lasing.

Frequency selective Bragg gratings and nonreciprocal optical elements may be used in the semiconductor URLs to greatly reduce or eliminate the lock-in effect. The unidirectionality of lasing in a URL occurs because of the unique design of the invention, which uses integrated nonreciprocal directionality filters to ensure light propagation in a preferred direction.

The nonreciprocal elements incorporate integrated Bragg gratings to filter and determine the light propagation direction, selective gain, and frequency control. Unlike semiconductor BRLs, any light reflected or scattered into the invention's URL cavity will not experience unwanted gain, thereby eliminating the problems associated with the locking of backscattered counterpropagating modes.

For each URL, all the lasing power is propagated into a single direction as opposed to an arbitrary splitting of the light power into two directions, causing reflections contributing to lock-in as is commonly experienced in BRLs. The nonlinearities or "kinks" inherent in BRL power output, which occur from modal instabilities arising from mutual coupling of counterpropagating modes, is greatly reduced or eliminated.

For related reasons, noise and instabilities resulting from gain competition between coupled and counterpropagating modes in a BRL are expected to be vastly reduced in the URL gyro invention. Preferably, all optical and light detection components are monolithically integrated onto a semiconductor microchip in a manner that would greatly reduce or eliminate the lock-in phenomenon.

BRIEF DESCRIPTION OF THE DRAWINGS

For a better understanding of the present invention, reference is made to the following description and accompanying drawings, while the scope of the invention is set forth in the appended claims.

DETAILED DESCRIPTION OF THE INVENTION

FIGS. 1–4 are diagrammatic representations of unidirectional ring laser (URL) rotation sensors and sensor components incorporating the principles of the present invention. The word "sensor" herein means and is meant to include all embodiments of the invention which incorporate other variations of the invention, including, but not limited to common terminology such as: gyro(s), gyroscope(s), inertial sensing unit(s), guidance sensor(s), inertial reference sensor(s) and rotation sensor(s).

Figure 1:
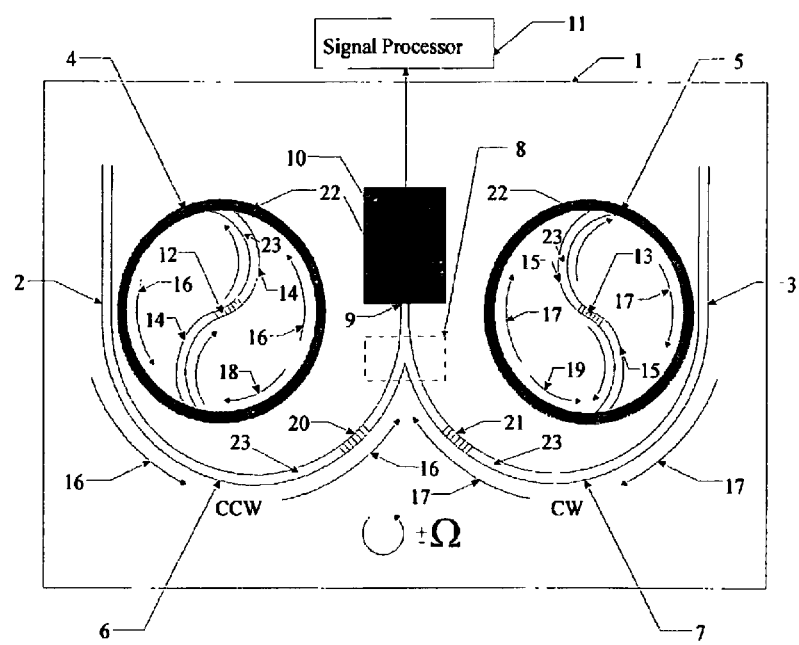
FIG. 1 is a planar view of the preferred embodiment of the present invention, showing the positional relationship between unidirectional ring lasers, directional waveguide couplers, Bragg grating filters, curved nonreciprocal directional couplers, Y-junction beam mixer, a photodetector, and a signal processor used to detect the Sagnac beat frequency.

As shown in FIG. 1, the sensor is implemented into a solid medium, on a semiconductor substrate 1, and is referred to as an integrated chip or integrated microchip. Nonconducting substrates can also be used, with appropriate modifications of contacting scheme so that both n- and p-type contacts would be on the same side of the substrate, as is well known to those skilled in the art.

Fabricated or formed within the integrated chip are directional waveguide couplers 2, 3, which in turn are used to outcouple counterpropagating light waves from a pair of isolated, nonsynchronized unidirectional ring lasers 4, 5. U.S. Pat. No. 5,349,601, whose contents are incorporated by reference, shows a ring diode laser and describes, at col. 5 line 50 to col. 6 line 49, its epitaxial layer structure and a preferred method for growing a single-quantum-well graded-index separate-confinement-heterostructure semiconductor wafer. Such a description may be applied to the construction of the isolated, nonsynchronized unidirectional ring lasers 4, 5 of the present application.

FIG. 1 shows that the orientation of light propagating inside the individual and isolated, nonsynchronized unidirectional ring lasers 4, 5 and coupled into the directional waveguide couplers 2, 3, is in opposite directions, counterclockwise (CCW) and clockwise (CW), respectively. The directional waveguide couplers 2, 3, are curved away 6, 7, from the unidirectional ring lasers 4, 5, and are joined at a Y-junction region 8, which in turn is terminated into or joined 9 to a photodetector 10. The beat frequency arising from the interaction of the light signals with the photodetector 10 is directed to and quantified by a signal processor 11. The directional waveguide couplers 2, 3 are positioned such that only a small fraction of internally circulating light, sufficient to produce a detectable signal at the photodetector 10, is coupled out of each unidirectional ring laser.

Bragg grating filters 12, 13, may be incorporated into the S-shaped passive waveguides 14, 15 to provide wavelength-selective—unidirectional lasing in the semiconductor ring lasers, as shown in FIG. 1 by the light propagation direction arrows, 16, 17. The light propagating in the direction not favored by the S-sections experiences much higher loss, since, when the light power is coupled into the S-section it is then routed into the opposite (i.e. preferred) direction. This loss mechanism results in a much higher lasing threshold, effectively suppressing the unwanted modes.

The passive S-shaped passive waveguide sections 14, 15, and Bragg filters 12, 13, serve as elements for selecting the direction of lasing mode propagation as well as suppressing the multimode operation of each unidirectional ring laser 4, 5. Thus, the ring lasing outputs are emitted only in the preferred direction of propagation, preventing lasing in the unwanted direction indicated by direction arrows 18, 19.

By use of the S-shaped sections 14, 15, unwanted spontaneously emitted or backscattered light 18, 19 that may propagate in the direction opposite to the preferred direction inside the unidirectional ring laser, is redirected into the preferred light propagation directions 16, 17.

Because of this routing, light propagating in the preferred CCW direction 16 inside the unidirectional ring laser 4 is evanescently coupled into the directional waveguide coupler 2, while, simultaneously, light propagating in the preferred CW direction 17 inside the unidirectional laser 5 is evanescently coupled into the directional waveguide coupler 3. The light outcoupled from each laser is guided by the transmitting waveguides 6, 7 to the beam-mixing Y-junction region 8, where the light signals are optically interfered (mixed) before entering the photodetector section 10.

Direct detection of the CCW or CW rotations (with the angular frequencies $+/-\Omega$) of the integrated chip is accomplished by the photodetector 10, which senses the difference (beat) frequency of the counterpropagating modes. The magnitude of the beat frequency is partly determined by the difference in free-running ($\Omega=0$) frequencies of individual unidirectional ring laser modes that can be controlled independently by making the two unidirectional ring lasers nonidentical. The electrical output of the photodetector is directly connected to a signal processor 11, which quantifies the angular velocity and orientation of the integrated chip rotation about an axis perpendicular to the chip plane, using well known conventional electronic processing techniques.

The filters 12, 13 inside the S-shaped sections 14, 15 are optional. They may be used in the event that the mode selectivity resulting from phase matching between the passive and active parts of the compound ring laser—S section cavity is not sufficient to ensure single-mode operation, or in order to select (not necessarily identical) specific free-running frequencies of unidirectional ring lasers 4 and 5. If the filters are used, their pass-band will have to be sufficiently wide to allow for frequency deviations associated with the Sagnac effect.

Additional Bragg filters 20, 21 may be incorporated in the transmitting waveguides, 6, 7. By incorporating the filters, additional rejection of unwanted backscattered or reflected light, and out-of-band optical signals may be achieved. Additionally, these filters can be fabricated as identical filters or nonidentical filters depending on the bandpass required to pass the Sagnac frequencies, and by the operating frequencies of the unidirectional lasers.

In another embodiment of the invention, quantum well intermixing (QWI) and quantum well interdiffusion processes are used to modify locally the bandgap of the quantum-well (QW) or quantum-dot (QD) material after the epitaxial growth is completed. The preferred embodiment of the semiconductor QW or QD material for this process is InGaAs/GaAs/AlGaAs, although other III-V material systems can also be used.

In general, QWI causes an increase in bandgap energy with a simultaneous reduction in the refractive index of QW and QD materials. Interdiffusion gradually modifies the interfaces between the barrier and the well from as-grown abrupt to graded and shallower. By selective tailoring of the refractive indices, discontinuities between varying refractive index regions and integrated components can be mitigated, thereby reducing backscattered light.

In FIG. 1, the shaded nonintermixed regions (active rings in the lasers and the photodetector) are labeled collectively 22, while the intermixed transparent S-sections, passive waveguide parts of directional couplers, transmitting waveguides, and the beam-mixing Y-junction are labeled collectively 23. The remaining parts of the chip are preferably left nonintermixed (i.e., absorbing) to reduce or eliminate any stray optical signals that could otherwise travel in a fully transparent chip.

Electrical current may be used to reduce the optical loss and maintain the passive sections 23 near transparency.

Reflections from the interface 9 between the Y-coupler/beam mixer 8 and the photodetector 10 may be reduced or eliminated by using a Brewster angle cut or a tapered waveguide section.

Figure 2:
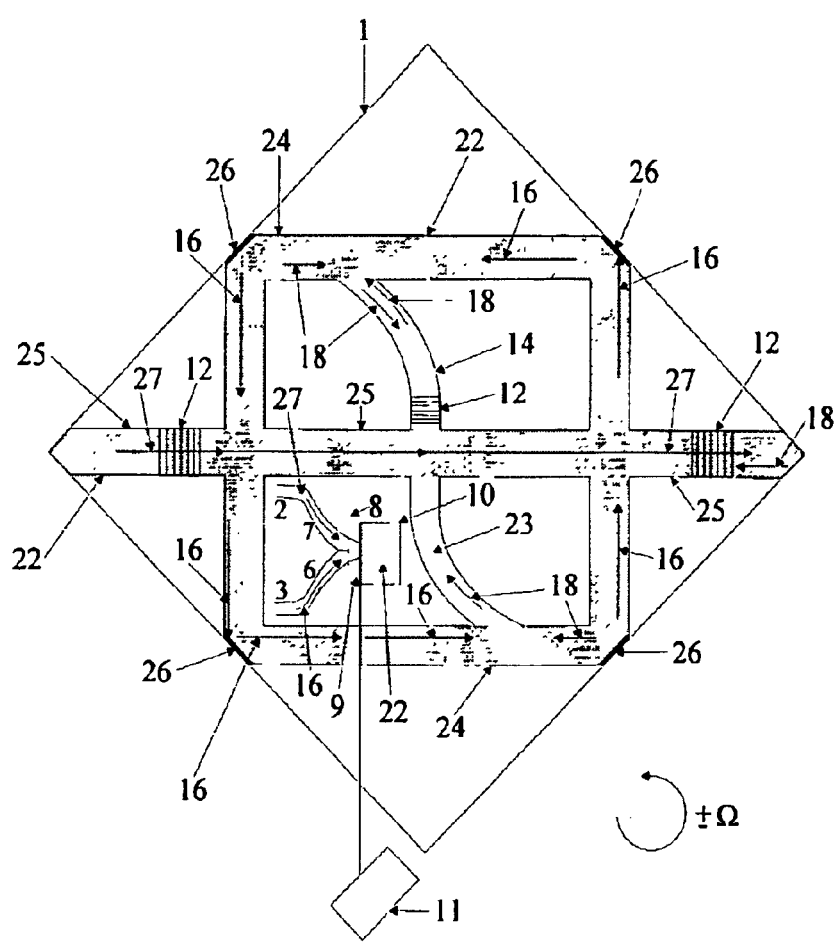
FIG. 2 is a planar view of another embodiment of the present invention which consists of a combination of a rectangular or square unidirectional ring laser and a straight-line laser, and the positional relationship of these lasers, waveguide couplers, Y-junction couplers, Bragg grating filters, Y-junction beam mixer, a photodetector, and a signal processor.

As shown in FIG. 2, light signals resulting from the combination and interaction of a rectangular-shaped unidirectional ring laser, 24 (or similarly a square-shaped unidirectional ring laser) and that of a straight line laser 25 are used for providing rotation sensing. The sensor is monolithically integrated on a semiconducting (or a nonconducting) substrate 1.

Fabricated on the substrate are directional waveguide couplers 2, 3, which are similar or identical in composition to the description of the first embodiment of this invention. The directional waveguide couplers 2, 3 are used to out-couple or direct the propagation of light waves from the noncircular unidirectional ring laser 24 and from the straight-line laser 25 to transmitting waveguides and the Y-junction region 8.

Mirror facets 26 may be located on each of four sides of the integrated gyro chip 1, for the purpose of reflecting and directing the light generated inside the unidirectional ring laser 24. The mirror facets 26 can be formed by either cleaving or etching the semiconductor chip 1. The mirror facets 26 are arranged and aligned in a manner to redirect the reflected light 16 axially and parallel along the four straight segments forming the rectangular loop of the unidirectional ring laser 24.

The S-shaped passive waveguide 14 may be incorporated into the unidirectional ring laser 24 in order to suppress lasing in the unwanted direction 18. The S-shaped passive waveguides redirect undesirable spontaneously emitted or backscattered light 18 into the preferred light propagation direction 16. Optional Bragg filters 12 may be incorporated into the S-shaped waveguide sections 14, for additional suppression of multimode operation. The straight-line laser 25 serves as a reference frequency source insensitive to rotation, while the unidirectional ring laser 24 serves as a rotation sensing element.

Due to the Sagnac effect, the unidirectional ring laser frequency is sensitive to the orientation (CCW or CW) and rate of rotation of the device 1. Depending on the sign of $\Omega$, the frequency of the rotating unidirectional ring laser can either increase or decrease compared to the reference frequency of the straight-line laser. Hence, with a proper initial frequency offset, the corresponding beat frequency between the straight-line laser signal 27 and the unidirectional laser signal 16 will also increase or decrease, thus providing information about both orientation and rate of the rotation.

The propagation of light generated by the unidirectional ring laser 24 may be in either a CCW or CW direction. For illustration purposes, the preferred direction of light propagation 16 inside the unidirectional laser 24 shown in FIG. 2 is in the CCW direction. The light generated in the straight-line laser 25 propagates in both directions 18 and 27, but only the light propagating in the direction 27 can couple into the directional coupler 2. The vertical alignment and positioning of the lasers 24, 25 overlap as shown in FIG. 2, and may either be fabricated in the same plane, or preferably may be positioned in proximity in isolated planes. As shown in FIG. 2, the signals from the two lasers 24, 25 are passed into a Y-junction region 8, which in turn is terminated or joined 9 to a photodetector region 10.

The beat frequency arising from the interaction of the light signals from the fixed laser frequency source 25 and the unidirectional ring laser rotation sensor 24 are further mixed and detected within the photodetector 10. Electrical signals from the photodetector 10, suitable for off-chip signal processing, are directed to and quantified by a signal processor 11. Since there are no counterpropagating waves to interact or beat under this arrangement of the lasers, the beat signal realized from this embodiment is a periodic signal at one-half the beat signal frequency realized from the first embodiment of the invention. Furthermore, as in the first embodiment, the beat signal in this embodiment of the invention is proportional to the rotation rate.

The rectangular ring laser in FIG. 2, utilizing total internal reflection mirrors, may be replaced with a unidirectional ring laser of arbitrary shape. The straight line laser in FIG. 2, relying on corner reflections for optical feedback, may be replaced with a distributed Bragg mirror laser, with Bragg filters 12 playing the role of distributed reflectors. If desired, the straight-line laser of FIG. 2 and the unidirectional ring laser of arbitrary shape need not be intersecting, but are only connected to directional waveguide couplers in a manner similar to that shown in FIG. 1. The light signals from both lasers are then carried by transmitting waveguides into a beam-mixing Y-junction and into the photodetector in the same manner as shown in FIG. 1.

Figure 3:
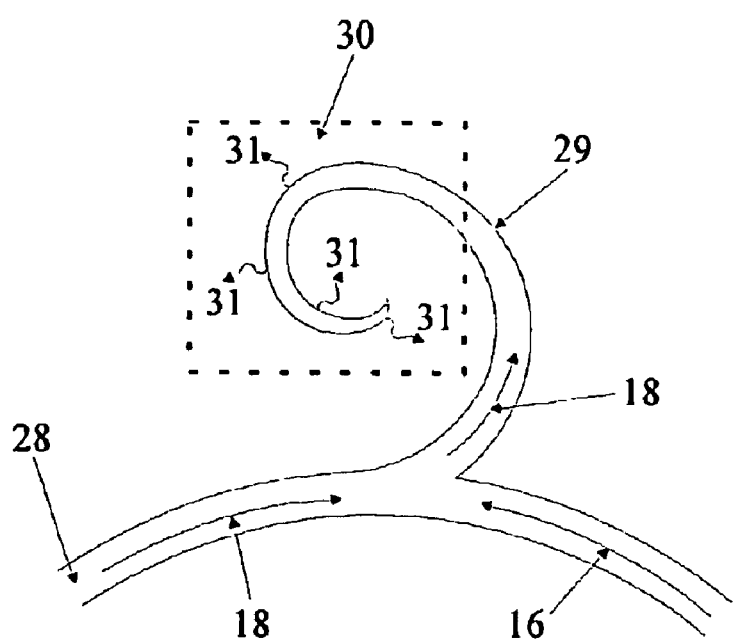
FIG. 3 is a planar view of a component of the present invention, showing the manner by which a spiral-shaped absorbing waveguide represents a direction-dependent loss element that can be used to favor a single direction of propagation within the ring laser or to suppress backscattered and reflected light in transmitting waveguides.

FIG. 3 shows branching-planar waveguide sections 28, 29 that are integrated onto the semiconductor chip 1. The waveguides 28 may be either passive or active, while the spiral elements 29 are absorbing. In FIG. 3, the desired light propagation direction is illustrated as the CCW direction 16, and the undesired (backscattered or reflected) light direction is represented by the CW direction 18. The purpose of the waveguide structure in FIG. 3 is to enable and enhance the lock-in-free operation of the unidirectional ring lasers 4, 5, 24, by reducing or eliminating backscattered or reflected light 18.

In addition, the same structure may be used in selected regions of directional waveguide couplers and transmitting waveguides 2, 3, 6, 7, shown in FIG. 1 and FIG. 2, in order to reduce or eliminate the signal reflected from the Y-junction/photodetector region, and thus eliminate lock-in.

Hence, suppression or elimination of the exchange of light between the two unidirectional ring lasers prevents the undesirable lock-in effects.

As depicted in FIG. 3, a spiral-shaped element 29 facilitates the coupling and redirection of unwanted light (spontaneously emitted, backscattered, or reflected light) 18 that propagates opposite to the preferred light propagation direction 16. The unwanted light 18 is routed to and guided through the spiral-shaped region 29 which is located in the area of high optical absorption 30. This coupling design removes a substantial portion of the unwanted light 18 traveling in the CW direction, while not affecting the light 16 propagating in the CCW direction.

FIG. 3 shows that the spiral elements 29 are gradually tapered in width to reduce the lateral confinement and increase the bending loss. Other embodiments with straight tapered waveguides or nontapered lossy waveguides are also possible. The tapering and spiraling dimensions may be chosen such that sufficient bending and narrowing of the spiral results in conversion of guided modes into leaky or radiation modes shown in FIG. 3 as oscillating arrows 31. The radiated energy emitted from the spiral element is directed at and absorbed by the absorbing region 30.

The absorbing region is simply as-grown nonintermixed material. The absorbing region or absorber 30 may also be formed by the quantum well intermixing process described in an earlier embodiment of the invention in order to provide a disordered and transparent region for enhancing the absorber properties. It should be noted that any light reflected back by the spiral element is redirected in the desirable direction 16, hence it is not necessary for the spiral to absorb/dissipate 100% of the entering light 18. The spiral elements 29 may be made of a material absorbing light at the laser wavelength. The spiral has a sufficiently small radius of curvature so that the light spills out as it propagates along the spiral. In addition, the spiral may be tapered as it curves so that guided modes would be converted into leaky or radiation modes. At the end of the spiral any reflected light is turned around. The spiral is arranged to receive light traveling in the reverse and undesired direction. Due to the shape of the spiral, whatever light traveling in the undesired direction that is not absorbed and is reflected at the end of the spiral exits the spiral traveling in the desired direction—i.e., toward the detector.

The branching spiral element 29 may also be coupled to and utilized by various selected waveguide sections as described earlier and shown in FIGS. 1, 2, and 4, where suppression of backscattered or reflected light is warranted. This includes: all directional waveguide couplers 2, 3, all transmitting waveguide components or sections 6, 7, all S-shaped sections 14, 15, all ring laser sections 4, 5, 24, all Y-junction regions 8, and all detector regions 10.

Figure 4:
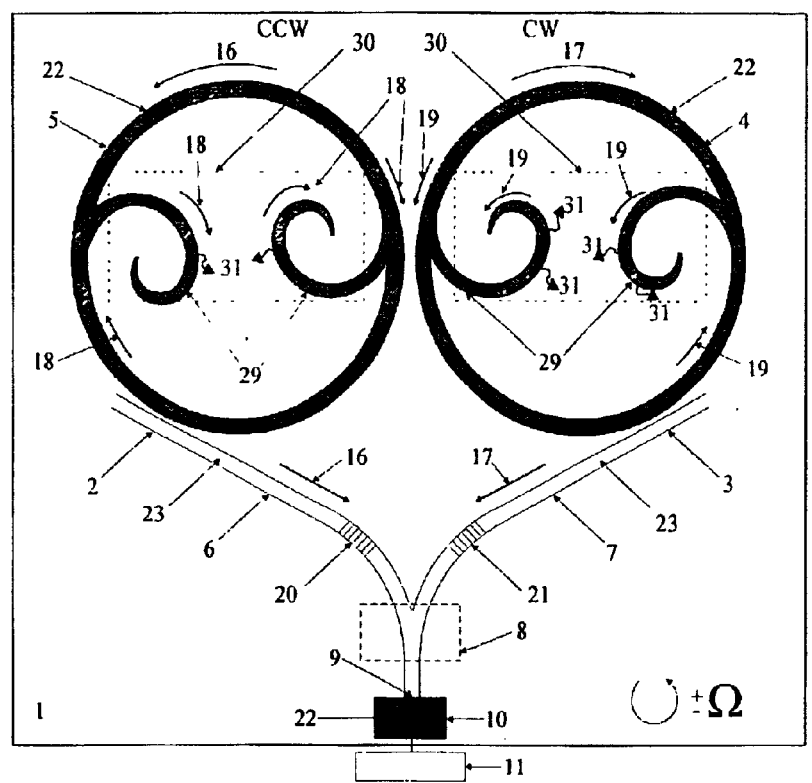
FIG. 4 is a planar view of another embodiment of the gyro invention showing the positional relationship between two unidirectional semiconductor ring lasers, directional waveguide couplers, multiple spiral-shaped attenuating waveguides, light absorbing regions, Bragg gratings, a Y-junction beam mixer, a photodetector, and a signal processor used to detect the Sagnac beat frequency.

FIG. 4 shows a monolithically integrated semiconductor gyro composed of two unidirectional semiconductor ring lasers 4 and 5 that are positioned in proximity with respect to each other. This configuration ensures uniform exposure and stabilization of their individual and mutual responses to internal and external perturbations, while maintaining their optical isolation to the degree necessary to prevent synchronization. It also ensures that any differential effects arising from perturbations such as temperature gradients, heating effects, electric and magnetic fields effects, atmospheric pressure effects, ionizing radiation effects, and other environmental effects are minimized or eliminated. The fabrication and operation of the unidirectional lasers shown in FIG. 4 have been described in the first embodiment of the invention.

The monolithically integrated semiconductor unidirectional ring laser of FIG. 4 may incorporate one or more branching planar spiral elements 29 configured as shown in FIGS. 3 and 4, for the purpose of suppressing unwanted backscattered or spontaneously emitted light 18, 19 as discussed in previous embodiments of the invention. As previously discussed in another embodiment of the invention, the spiral elements 29, while preferably themselves absorbing, are positioned in proximity to absorber regions 30 which capture the leaky or radiation modes 31, emitted from the spiraled elements.

The following epitaxial wafer structure may be used for fabrication of monolithically integrated semiconductor unidirectional ring laser gyroscope:
1. several-hundred-micron-thick silicon-doped GaAs substrate;
2. 0.75-$\mu$m-thick tellurium-doped GaAs buffer layer;
3. 1-$\mu$m-thick tellurium-doped $Al_{0.3}Ga_{0.7}As$ cladding layer;
4. 0.1-$\mu$m-thick tellurium-doped $Al_xGa_{1-x}As$ graded region with Al content x changing linearly from 30% to zero;
5. an undoped double-quantum-well structure comprising 100-Å-thick GaAs barriers that surround two 100-Å-thick $In_{0.2}Ga_{0.8}As$ quantum wells;
6. 0.1-$\mu$m-thick carbon-doped $Al_xGa_{1-x}As$ graded region with Al content x changing linearly from zero to 30%;
7. 1-$\mu$m-thick carbon-doped $Al_{0.3}Ga_{0.7}As$ cladding layer;
8. 50-nm-thick GaAs layer heavily doped with carbon.

The unidirectional ring lasers 4, 5 may have a racetrack shape, with straight sections parallel to passive waveguides in directional couplers 2, 3. The ridge-structure ring lasers 4, 5, the ridge-structure S-sections 14, 15, the passive ridge waveguides in directional couplers 2, 3, the transmitting ridge waveguides 16, 17, the ridge Y-junction 8, and the photodetector mesa 10 may be defined by etching away the top 0.85 $\mu$m of the epitaxial wafer.

The ridge-structure ring lasers 4, 5, the ridge-structure S-sections 14, 15, the passive ridge waveguides in directional couplers 2, 3, the transmitting ridge waveguides 16, 17, and the mixing part of the Y-coupler 8 may have all the same width of 3 $\mu$m. The distance between the passive waveguides and the straight sections of the racetrack-shaped unidirectional ring lasers in the directional couplers 2, 3 may be 3 $\mu$m. The radius of half-circular arc sections of the racetrack-shaped unidirectional ring lasers 4, 5 may be 1 mm. The length of the straight-line sections of the racetrack-shaped unidirectional ring lasers 4, 5 may be 1 mm.

The spiral element 29 may consist of three half-circles joined tangentially. The outer half-circle may have the radius of 450 $\mu$m, the middle half-circle may have the radius of 300 $\mu$m, and the inner half-circle may have the radius of 200 $\mu$m. The inner half circle may end with a taper section, with the ridge width linearly decreasing from the initial 3 $\mu$m to final 1 $\mu$m over the distance of 20 $\mu$m. The Brewster angle cut at the interface 9 between the beam-mixing section 8 and the photodetector 10 may be at an angle of 26.7° with respect to the ridge waveguide axis.

The lock-in-free, monolithically integrated semiconductor ring laser gyroscope of the invention includes, therefore, two unidirectional semiconductor ring lasers 4, 5. Each of the lasers are isolated (nonsynchronized) and decoupled from the other and arranged in proximity to each other. They are located on a common planar semiconductor substrate and provide circular and unidirectional propagation of light 16, 17 in opposite directions from each other (CW 17 and CCW 16). When placed under rotation, the two lasers act together to detect the angular velocity and direction of motion of the applied rotation, via the well-known Sagnac effect.

Unlike a bidirectional semiconductor ring laser, each unidirectional semiconductor ring laser 4, 5 of the invention:

a) has all of its lasing power is propagated into a single direction 16, 17 This contrasts with arbitrarily splitting the light power in a bidirectional ring laser into two directions, thereby subsequently resulting into reflections (backscattering) and thereby contributing to undesirable gyroscopic lock-in effects.

b) greatly reduces or eliminates the nonlinearities or "kinks" inherent in bidirectional laser power outputs, which arise from the mutual coupling of contra-propagating modes.

c) any light reflected into the unidirectional ring laser cavity of the present invention will not experience unwanted gain, thereby eliminating the problems associated with the locking of backscattered counterpropagating modes in bidirectional semiconductor ring lasers.

Further, each unidirectional ring laser 4, 5 of the invention eliminates the gain competition between coupled and contra-propagating modes that are inherent in a semiconductor bidirectional ring laser. The present invention provides a lower level of laser noise and power instabilities, thereby vastly improving the efficiency and operation of the gyroscopic action.

The unidirectional semiconductor ring laser may include integrated, passive, nonreciprocal "S-shaped" optical elements 14, 15 that redirect the unwanted backscattered light 18, 19 into the preferred propagation direction 16, 17 for the purpose of mitigating or eliminating the well-known cause for gyroscopic lock-in in semiconductor ring lasers.

Each passive, nonreciprocal "S-shaped" optical element 14, 15 integrated as part of the unidirectional lasers 4, 5 structure may also possess integrated frequency selective Bragg gratings 12, 13 to enhance the filtering and rejection of any backscattered light 18, 19. Each Bragg grating insures selective gain and frequency control of the individual isolated, nonsynchronized, unidirectional ring laser 4, 5 output power.

Employing quantum well interdiffusion or quantum well intermixing techniques to alter and customize the refractive indices between active (nontransparent) and passive (transparent) regions of the components and integrated regions of the invention reduces or eliminates light scattering from the propagation of light through these regions. As a result of the quantum well intermixing process, smoothly varying index transition regions form.

Quantum well intermixing is applied in fabricating the invention to enable efficient and low light scattering at interfacing regions of the monolithically integrated gyro components. The components are from unidirectional ring lasers 4, 5 to the "S-shaped" nonreciprocal filters 14, 15 and to the proximity waveguide couplers 2, 3; from the distant waveguide coupler regions 6, 7 to the Y-junction mixing region 8; and from the Y-junction mixing region to the detector 10 and interface region 9. Use of the quantum well intermixing process attains efficient evanescent coupling of the unidirectional light output from each unidirectional laser 4, 5 to individual and isolated waveguide couplers 2, 3 passing in proximity to each unidirectional ring laser.

Each waveguide coupler 2, 3 may possess Bragg filters 20, 21. The Bragg filters 20, 21 are for providing additional rejection of backscattered light and out-of band optical signals as well as for providing additional wavelength-selective and unidirectional light conditioning. The Bragg filters 20, 21 may be arranged so these functions are carried out prior to the introduction of the counterpropagating light signals 16, 17 into the Y-junction mixing region 8.

Bragg filters 20, 21 may be fabricated as identical filters or nonidentical filters depending on the bandpass required to pass the Sagnac frequencies, and by the operating frequencies of the unidirectional lasers 4, 5. The Y-junction mixing region 8 provides an efficient means for optically interacting the counterpropagating light signals from the two unidirectional ring lasers prior to the introduction of the optically mixed signals into the photodetector section 10.

By reverse biasing the integrated semiconductor photodetector 10, the light signals are interfered in the Y-junction mixing region 9 and will be detected as a beat frequency of the CCW and CW rotations ($+/-\Omega$) of the unidirectional lasers 4, 5. The magnitude of the beat frequency will be partly determined by the difference in the free-running ($\Omega=0$) frequencies of the individual unidirectional ring laser modes, and, these modes can be controlled independently by making the two unidirectional lasers, nonidentical.

Sensing of the electrical output of the photodetector 10 using conventional signal processing 11 techniques results in determination of the direction and angular velocity of the single axis micro gyro chip undergoing a rotation ($+/-\Omega$) as shown in FIG. 1. By aligning and combining three single-axis, monolithically integrated, semiconductor gyro chips of the invention, a three-axis gyroscope may be fabricated. This provides detection, determination and quantification of the direction and speed of the movement with each gyro chip perpendicular to the axis of the remaining two single axis gyro chips.

The changes to the detector output signals 10, 11 can be correlated using conventional spectrum analyzers, digital voltmeters, and other well known voltage-current-resistance and frequency sensing techniques. A common electronic signal processing 11 can be used to characterize, quantify and determine the Sagnac frequency shifts, which shifts may be directly related to the direction and speed of the single axis and 3-axis gyroscopes.

Light signals resulting from the combination and interaction of a rectangular-shaped unidirectional laser 24 (or similarly a square-shaped unidirectional ring laser) and that of a straight line laser 25 can be used for providing rotation sensing. When placed under rotation, the lasers 24, 25 act together to detect the angular velocity and direction of motion of the applied rotation, via the well-known Sagnac effect.

Suppression and control of reflected and backscattered light causing lock-in common to ring lasers is minimized or eliminated by using branching-planar waveguide sections 28, 29. The regions are integrated onto the semiconductor chip 1 to favor desired light propagation direction while suppressing the undesired (backscattered) light direction represented by the CW direction 18.

The active region of the unidirectional ring-cavity lasers 4, 5, 24 and the straight-line laser 25 is formed within the heterostructure regions, as is well known to those skilled in the art. Quantum wells or quantum dots can be used as the active medium.

The quantum dot lasers are known to provide a quasi-discrete emission spectrum resulting in relatively low internal losses due to the low interband absorption of the unpumped regions present in the mode volume. Benefits of quantum dot lasers for improving the monolithically integrated semiconductor ring laser design and performance include a very low threshold current density and a very low value of the linewidth broadening factor which reduces the frequency locking range.

The estimated maximum modal gain in the "ground-state" band of InAs quantum dots inserted into InGaAs quantum well is approximately 5 cm$^{-1}$, indicating that noninverted quantum dots will result in small losses, below 5 cm$^{-1}$. Due to the expected low loss resulting from the presence of the quantum dots, a propagation distance of ~2 mm for e-fold attenuation of the radiation flux will result.

The internal loss coefficient in some quantum dot lasers ranges from 1–2 cm$^{-1}$, allowing therefore the monolithically integrated semiconductor ring laser to have a long cavity length without deterioration of the ring laser power conversion efficiency, and thus to give improved performance than lasers with quantum-well active regions. The reduction in cavity losses realized by using quantum dots may be advantageous where large-area ring lasers (e.g. a 15.7-mm cavity length for a 5-mm-diameter ring laser) are used in conjunction with passive and active integrated optic components such as waveguides and waveguide couplers.

Quantum dot lasers used in this fashion also provide for low current densities of approximately 10 A/cm$^2$ at room temperature, which will directly benefit the performance of low-power monolithically integrated semiconductor ring laser designs. Very low values (close to zero) of the linewidth broadening factor in quantum dot lasers will result in narrower linewidth of the lasing modes, which will enhance the resolution of the gyro and will reduce the locking range. This eases the requirements for low coupling between the two unidirectional ring lasers.

The beam-mixing Y-junction region 8 may be any type of semiconductor mixing region. The photodetector region 10 may be any type of detector of Sagnac-shifted frequencies and may employ more than one photodetector. Indeed, the photodetector region may be part of a detector structure that encompasses each of the semiconductor mixing region, the semiconductor waveguides 6, 7, and the directional waveguide couplers 2, 3 as well as the photodetector region. The semiconductor waveguides 6, 7 may be replaced by any structure that guides or transports the light waves from the directional waveguide couplers 2, 3 to the photodetector region 10. If multiple photodetectors are used, each detecting signals from separate lasers, their measurements will need to compensate for losses and calibrated with each other to provide detection of Sagnac-shifted frequencies.

While the foregoing description and drawings represent the preferred embodiments of the present invention, it will be understood that various changes and modifications may be made without departing from the spirit and scope of the present invention.

What is claimed is:

1. A gyroscope, comprising
   at least one rotation sensing element containing at least two optically isolated semiconductor lasers of which at least one is unidirectional to propagate lasing light waves in a preferred propagation direction and at least a further one is selected from a group consisting of a frequency reference laser insensitive to rotation and another unidirectional ring laser configured to counter-propagate lasing light waves;
   semiconductor directional waveguide couplers each associated with one of the at least two semiconductor lasers and arranged to evanescently couple or direct the propagated lasing light waves so as to generate evanescently outcoupled signals;
   at least one semiconducting mixing region; being configured to mix the evanescently outcoupled signals;
   semiconductor waveguides each configured to guide the evanescently outcoupled signals to the at least one semiconductor mixing region; and
   at least one detector configured to detect beating of Sagnac-shifted frequencies of the evanescently outcoupled signals that are mixed.

2. The gyroscope of claim 1, wherein each unidirectional semiconductor laser is configured so as to avoid propagating the lasing light waves bidirectionally.

3. The gyroscope of claim 1, wherein the detector is an integrated semiconductor photodetector.

4. The gyroscope as in claim 3, further comprising a Brewster angle cut between said photodetector and said mixing region and configured to reduce reflections.

5. The gyroscope as in claim 3, further comprising a tapered waveguide section between said photodetector and said mixing region and configured to reduce reflections.

6. The gyroscope of claim 1, further comprising semiconductor optical filters configured and arranged to filter backscattered or reflected light and out-of-band signals arising from each of the counterpropagated lasing light waves.

7. The gyroscope of claim 6, wherein the unidirectional semiconductor lasers have transmitting waveguides, the semiconductor optical filters being within the transmitting waveguides.

8. The gyroscope as in claim 1, further comprising an S-shaped passive waveguide arranged to redirect spontaneously emitted, backscattered, or reflected counterpropagating light into the preferred unidirectional propagation direction.

9. The gyroscope as in claim 8, further comprising a light filter in the S-shaped passive waveguide arranged to suppress multimode operation of the at least one unidirectional semiconductor laser.

10. The gyroscope as in claim 8, further comprising a Bragg filter in the S-shaped passive waveguide arranged to suppress multimode operation of the at least one unidirectional semiconductor laser.

11. The gyroscope as in claim 1, wherein the mixing region is a Y-junction.

12. The gyroscope as in claim 1, wherein each of the at least two semiconductor lasers are isolated from each other to prevent frequency lock-in, but located on a common plane.

13. The gyroscope as in claim 1, wherein each of the at least two semiconductor lasers are isolated from each other to prevent frequency lock-in and located in different planes.

14. The gyroscope as in claim 1, wherein active regions of the at least two semiconductor lasers comprise at least one quantum well.

15. The gyroscope as in claim 1, wherein active regions of the at least two semiconductor lasers comprise quantum dots.

16. The gyroscope as in claim 1, further comprising a spiral shaped waveguide arranged to redirect spontaneously emitted, backscattered, or reflected light into the preferred unidirectional propagation direction.

17. The gyroscope as in claim 16, wherein the spiral shaped waveguide has tapering and spiraling dimensions sufficient to result in conversion of guided modes into leaky or radiation modes.

18. The gyroscope as in claim 1, further comprising a branching planar waveguide arranged to redirect backscattered or reflected light that arises from counterpropagating modes of the at least two semiconductor lasers.

19. The gyroscope as in claim 1, wherein the unidirectional semiconductor lasers are on a common substrate.

20. The gyroscope as in claim 1, further comprising:
a suppressor waveguide arranged to suppress multimode operation of the at least one unidirectional semiconductor laser and to redirect backscattered or reflected light that arises from counterpropagating modes of the at least two semiconductor lasers.

21. The gyroscope as in claim 1, further comprising mirror facets arranged in path of the propagated light waves.

22. A gyroscope, comprising
at least one rotation sensing element containing at least two semiconductor lasers of which at least one is unidirectional to propagate lasing light waves in a preferred unidirectional propagation direction and at least a further one is selected from a group consisting of a frequency reference laser insensitive to rotation and another unidirectional ring laser configured to counterpropagate lasing light waves, wherein the frequency reference laser is a straight line laser;
semiconductor directional waveguide couplers each associated with one of the at least two semiconductor lasers and arranged to evanescently couple or direct the propagated lasing light waves so as to generate evanescently outcoupled signals;
at least one mixing regions being configured to mix the evanescently outcoupled signals;
semiconductor waveguides each configured to guide the evanescently outcoupled signals to the at least one semiconductor mixing region; and
at least one detector configured to detect beating of Sagnac-shifted frequencies of the evanescently outcoupled signals that are mixed.

23. A method of operating a gyroscope, comprising
propagating light waves with at least one rotation sensing element that has at least two optically isolated semiconductor lasers selected from a group consisting of at least one pair of optically isolated unidirectional ring lasers configured to propagate light in counterpropagating modes and at least one pair of a unidirectional ring laser and a frequency reference laser, both optically isolated from each other, at least one of the at least two optically isolated semiconductor lasers being a unidirectional ring laser;
evanescently coupling or directing the propagated light waves with semiconductor directional waveguide couplers each associated with one of the at least two semiconductor lasers so as to generate evanescently outcoupled signals;
guiding the evanescently outcoupled signals with semiconductor waveguides from the directional waveguide couplers into a semiconductor mixing region;
mixing the evanescently outcoupled signals with each other in the semiconductor mixing region; and
detecting a beating of Sagnac-shifted frequencies of the mixed, evanescently outcoupled signals with a detector.

24. The method as in claim 23, further comprising avoiding bidirectional propagation of the lasing light waves by each of the unidirectional ring lasers.

25. The method as in claim 23, further comprising filtering, with semiconductor optical filters, backscattered or reflected light and out-of-band signals that arise from the counterpropagating modes.

26. The method as in claim 23, further comprising suppressing multimode operation of the unidirectional laser.

27. The method as in claim 23, further comprising reducing reflection from the detector by incorporating a Brewster-angle cut at an end of the mixing region.

28. The method as in claim 23, further comprising reducing reflection of the detector by tapering at least one of the semiconductor waveguides and mixing region.

29. The method as in claim 23, further comprising forming the semiconductor waveguides and the mixing region from a quantum-well or quantum-dot material, and increasing locally a bandgap of the quantum-well or quantum-dot material to reduce absorption of the evanescently outcoupled signals.

30. The method as in claim 23, wherein the detector, the semiconductor waveguides and the mixing region are elements, further comprising applying electrical current to any of the elements to reduce absorption of light in the elements.

31. The method as in claim 23, wherein the semiconductor mixing region is a Y-junction.

32. The gyroscope of claim 22, wherein the at least two semiconductor lasers are optically isolated from each other.

33. A method of operating a gyroscope, comprising
propagating light waves with at least one rotation sensing element that has two semiconductor lasers selected from a group consisting of at least one pair of unidirectional ring lasers configured to propagate light in counterpropagating modes and at least one pair of a unidirectional ring laser and a frequency reference laser, at least one of the at least two semiconductor lasers being a unidirectional laser, wherein the frequency reference laser is a straight line laser;
evanescently coupling or directing the propagated light waves with semiconductor directional waveguide couplers each associated with one of the at least two semiconductor lasers so as to generate evanescently outcoupled signals;

guiding the evanescently outcoupled signals with semiconductor waveguides from the directional waveguide couplers into a semiconductor mixing region;

mixing the evanescently outcoupled signals with each other in the semiconductor mixing region; and detecting a beating of Sagnac-shifted frequencies of the mixed, evanescently outcoupled signals with a detector.

34. The method of claim 33, wherein the two semiconductor lasers are optically isolated from each other, the at least one pair of unidirectional ring lasers are optically isolated from each other, and the at least one pair of a unidirectional ring laser and a frequency reference laser are optically isolated from each other.

35. A gyroscope, comprising at least one rotation sensing element containing at least two optically isolated semiconductor lasers of which at least one is unidirectional to propagate lasing light waves in a preferred propagation direction and at least a further one is selected from a group consisting of a frequency reference laser insensitive to rotation and another unidirectional ring laser configured to counterpropagate lasing light waves; and a detector apparatus responsive to the light waves to detect any Sagnac-shifted frequencies of the light waves.

36. A method of forming a gyroscope, comprising providing at least one rotation sensing element containing at least two optically isolated semiconductor lasers of which at least one is unidirectional to propagate lasing light waves in a preferred propagation direction and at least a further one is selected from a group consisting of a frequency reference laser insensitive to rotation and another unidirectional ring laser configured to counterpropagate lasing light waves; and positioning a detector to detect any Sagnac-shifted frequencies of the light waves.

37. The method as in claim 36, further comprising arranging the at least one rotation sensing element and the detector on or in an integrated semiconductor substrate.

38. The method as in claim 36, further comprising arranging at least one waveguide between the at least one rotation element and the detector to guide the light waves.

39. The method as in claim 36, further comprising arranging a waveguide to redirect spontaneously emitted, backscattered or reflected counterpropagating light into the preferred unidirectional propagation direction.

40. The method as in claim 36, further comprising arranging a suppressor to suppress multimode operation of the at least one rotation sensing element.

41. The method as in claim 36, further comprising arranging an element to prevent frequency lock-in of the light waves.

42. The method as in claim 36, further comprising varying a bandgap of a quantum well or quantum-dot material to reduce absorption of the light waves.

43. The method as in claim 36, further comprising arranging a coupler to evanescently couple the light waves.

44. The method as in claim 36, further comprising arranging a region to mix the light waves with each other before reaching the detector.

45. A method of operating a gyroscope, comprising propagating light waves with at least one rotation sensing element containing at least two optically isolated semiconductor lasers of which at least one is unidirectional to propagate lasing light waves in a preferred propagation direction and at least a further one is selected from a group consisting of a frequency reference laser insensitive to rotation and another unidirectional ring laser configured to counterpropagate lasing light waves; and detecting any Sagnac-shifted frequencies of the light waves.

46. The method as in claim 45, further comprising guiding the light waves with at least one waveguide between the at least one rotation element and the detector.

47. The method as in claim 45, further comprising redirecting spontaneously emitted, backscattered or reflected counterpropagating light into the preferred unidirectional propagation direction.

48. The method as in claim 45, further suppressing multimode operation of the at least one rotation sensing element.

49. The method as in claim 45, further comprising preventing frequency lock-in of the light waves.

50. The method as in claim 45, further comprising reducing absorption of the light waves by varying a bandgap of a quantum well or quantum-dot material.

51. The method as in claim 45, further comprising evanescently coupling the light waves.

52. The method as in claim 45, further comprising mixing the light waves with each other before the detecting.

* * * * *

UNITED STATES PATENT AND TRADEMARK OFFICE
CERTIFICATE OF CORRECTION

PATENT NO. : 6,937,342 B2  Page 1 of 1
DATED : August 30, 2005
INVENTOR(S) : Osinski et al.

It is certified that error appears in the above-identified patent and that said Letters Patent is hereby corrected as shown below:

<u>Title page,</u>
Item [56], References Cited, FOREIGN PATENT DOCUMENTS,
delete "020000205864" and insert -- 02000205864 --, therefor.

<u>Column 15,</u>
Line 57, delete "regions" and insert -- region; --, therefor.

Signed and Sealed this

Thirteenth Day of December, 2005

JON W. DUDAS
*Director of the United States Patent and Trademark Office*